Patented July 23, 1940

2,208,770

UNITED STATES PATENT OFFICE 2,208,770

PROCESS FOR CONTINUOUS ESTERIFICATION

Thomas J. McKeon, Parlin, N. J., assignor to E. I. du Pont de Nemours & Company, Wilmington, Del., a corporation of Delaware No Drawing. Original application November 15, 1935, Serial No. 49,932. Divided and this application April 20, 1940, Serial No. 330,797

6 Claims. (Cl. 260—488)

This invention relates to an improved process for esterification and more particularly to a process for the continuous production of organic esters of the liquid aliphatic alcohols and aliphatic acids, including butyric.

Esterification reactions are based on a chemical combination of an alcohol and an organic acid, resulting in the formation of an ester and water. Such a reaction is reversible. The formation of ester and water proceeds at a decreasing rate, while the products formed begin to react at an increasing rate, reforming alcohol and acid. This action proceeds to a point known as equilibrium, where the speed of both reactions is the same and there is no further quantitative change of the materials involved. Therefore, in order to have the reaction progress, it is necessary to shift this equilibrium to favor the formation of the ester and this is done in general practice by the removal of the ester and water from the sphere of reaction.

Present manufacturing operations make use of the so-called "batch" process. This method consists chiefly in charging into a still kettle, a predetermined quantity of acid, alcohol and catalyst. A slight excess of alcohol is usually added to compensate for any losses, resulting from solubilty in water. The charge is refluxed for a short period and the distillate then passed through a separator to remove the water, the ester layer being returned to the still kettle. This is continued until all of the water has been removed. Finally the unconverted acid and the catalyst, which is usually an acid, are neutralized and the charge is then ready for distillation.

The principal disadvantages of this process are low production rate, non-uniformity in product and high losses.

A semi-continuous process, later developed, avoids some of the deficiencies of the batch process. As in the case of the batch process, an excess acid, alcohol and catalyst are charged into the still kettle. After a refluxing cycle, the distillate is carried off through a separator, where stratification takes place, providing an ester and a water layer as in the batch process. At this point, however, the semi-continuous process deviates, in that the ester layer is not returned to the reaction zone, but is dropped by gravity to a storage tank. The water layer is likewise dropped by gravity to a receiver to be later rectified to recover ester, alcohol and acid which may have been carried over with it.

After the removal of a portion of the reaction products, additional alcohol is fed into the kettle at a rate prescribed by operating conditions. During this cycle the acid concentration gradually drops to a point where esters of acceptable ester value cannot be produced. Generally, however, addition of alcohol is continued, forming a product of low ester value. This product then is used in the initial charge of subsequent runs.

The semi-continuous process has certain advantages over the batch process in that production is increased and a more uniform quality ester is produced. Better yields and lower operating costs are likewise afforded.

The chief disadvantage of this process is the non-producing time involved, resulting in the high power consumption required in heating the charge and for exhausting the weak ester alcohol mixture. In addition, the charge is easily thrown off balance because of inadequate control and this results in high acidity, or low ester value of the finished product.

The present invention provides a process for the esterification of aliphatic monohydric alcohols wherein the several deficiencies of the batch and semi-continuous methods are avoided.

This invention has as an object the provision of a process for the continuous production of esters of aliphatic alcohols. A further object is to provide a process for the esterification of aliphatic alcohols whereby substantial operating economies are secured in that production is materially increased, and at the same time permitting a reduction in the amount of equipment necessary for the final purification. A still further object of the invention is the provision of an esterification process which can be easily controlled so as to yield a product of high ester value of uniform quality such that necessity for final fractionation is eliminated.

These objects are accomplished by charging a still with a charge of alcohol and acid in which the latter is in excess, and thereafter distilling until the alcohol approaches depletion, after which equivalent portions of acid and alcohol are added to the reaction mixture at a rate substantially that at which the crude ester is withdrawn. The operating ratio of acid to alcohol is between about 20 to 40 parts of acid for each part of alcohol.

The invention is illustrated by the following specific example for the esterification of normal butyl alcohol and acetic acid, reference to which will clearly indicate the various steps in the process; however, it will be understood that this example is only illustrative.

In this example, sulfuric acid is used as a catalyst to increase the speed of reaction of the acid and alcohol. Also, in order to obtain the greatest conversion of acid and alcohol to ester, an operating excess of acid of the order of 20 to 40 times the theoretical equivalent of the alcohol is employed. In any case, at least 5 volumes of lower aliphatic monocarboxylic acid should be present in the reaction mixture to one volume of a lower aliphatic monohydric alcohol. In adopting ratios of this order, it has been found that in operating the process as subsequently explained the production of a material of high ester value is assured. However, reaction mixtures which are too concentrated in acid are not desirable, since after the ester is formed it is necessary to separate it from the reaction mixture by means of a fractionating column and to keep the acid losses at a minimum in the distillate. To meet this contingency, the reaction mixture is diluted with water.

The following mixture is charged into a 2200 gallon reaction vessel fitted with a conventional distilling column.

| | Gallons |
|---|---|
| Acetic acid (100%) | 750 |
| N-butyl alcohol | 150 |
| Sulfuric acid (93%) | 30 |
| Water | 450 |
| | 1380 |

This charge is heated to a temperature of 100° to 105° C. by means of a steam coil or other means at the bottom of the kettle. The vapors of the products of reaction, ester and water, some acid and some alcohol rise through a distilling column. The pressure of the vapors at the base of the column is controlled at about 30–36" of water by a steam regulator.

The alcohol-acid mixture is pumped into the kettle at the same rate as the products distill off so as to make the operation continuous. Acetic acid (90%) and N-butyl alcohol (99%) are drawn from storage tanks by a proportioning pump or other suitable means in fixed proportions and in such quantities as to yield 200–250 gallons per hour of 90% ester. This proportion is normally about:

| | Gallons |
|---|---|
| 90% acetic acid | 90 |
| N-butyl alcohol | 155 |

The mixture is pumped through a preheater where it attains a temperature of 90° C. Sulfuric acid to the extent of 0.1 to 0.3% of the mixture is preferably added to the alcohol to facilitate esterification in the preheater, which may amount to about a 10% conversion of acid to ester.

From the preheater, the hot mixture is refluxed and passed through a column which is packed with Raschig rings or plates after which it runs into the reaction vessel which contains the initial charge, as noted above. It is here that the balance of the esterification takes place. The vapors rise through a distilling column and then into a tubular condenser where they are condensed and cooled to less than 25° C.

The condensate stratified into two layers, crude ester and water. Of the total condensate which boils at 90° to 92° C., the ester layer is roughly 90% and the water layer 10%. The composition of the two phases is about as follows:

| | Ester layer | Water layer |
|---|---|---|
| | Percent | Percent |
| Ester | 91.0 | 2.5 |
| Alcohol | 7.9 | 4.0 |
| Water | 1.0 | 93.0 |
| Acetic acid | 0.1 | 0.5 |
| | 100.0 | 100.0 |

The total condensate amounts to about 5000 pounds per hour.

The ester layer, being the lighter of the two, rises to the top, while the water settles to the bottom. The ester is drawn from the top. The ester is collected and is then washed with a dilute solution (7%) of alkali to remove traces of free acid. This is followed by two fresh water washes to remove the alkali from solution in the ester. After neutralization, the ester is pumped to the refining system. A portion of the ester in quantities of such magnitude as to maintain a reflux ratio of 2 to 2½ in the column is drawn from the separator and passes onto the top plate of the distilling column as reflux. The ester removed amounts to about 1500 pounds per hour while that refluxed amounts to about 3000 pounds per hour.

The above example illustrates one specific embodiment of the invention. The method is not limited to any particular apparatus, but it is important that an excess of acid be present initially and that after distillation takes place, the acid feed be withheld until the alcohol is almost depleted whereupon equivalent amounts of alcohol and acid are fed into the mixture at about the speed at which they are distilled off. The operating ratio of acid to alcohol in the reaction vessel in chemical equivalents is about 20 to 40 parts of acid to each part of alcohol.

The process of the invention is applicable to the esterification of other aliphatic alcohols having 3 to 5 carbon atoms; for example, isobutyl, amyl, or mixtures thereof, propyl, secondary butyl and secondary amyl alcohol. Esters of acids other than acetic, such as propionic and butyric acid may also be produced by the process of the invention. In general, the process is of particular utility in the large scale production of esters of liquid aliphatic alcohols; i. e., lower alcohols which are normally liquid at room temperatures.

The continuous process as practiced according to the foregoing description provides higher ratios of production with, of course, corresponding lowering in costs of the final product.

A high quality product is obtained through operation under conditions which are capable of accurate control and in practice the improved process provides material of high ester value without additional fractionation in auxiliary equipment.

The non-producing time characterizing the semi-continuous process occasioned by getting up to heat and for exhausting, is eliminated in the present method.

Considerably less equipment is required than in practices where complete installations were required for each step in the manufacture of a commercially acceptable product.

The process also assures greater uniformity as regards the quality and properties of the final ester.

Lower power consumption is afforded because of the fact that the process is continuous, thereby avoiding losses in heating the charge and for exhausting the weak ester alcohol mixture.

It is apparent that many widely different embodiments of this invention may be made without departing from the spirit and scope thereof; and, therefore, it is not intended to be limited except as indicated in the appended claims.

This case is a division of copending application Serial No. 49,932, filed November 15, 1935, by McKeon, Pyle, and Van Ness.

I claim:
1. A continuous process for preparing esters from the lower monocarboxylic acids and ali- phatic alcohols having from 3 to 5 carbon atoms, which comprises heating a mixture of an excess of about 5 volumes of monocarboxylic acid for each volume of alcohol, in the presence of a catalyst, distilling the said mixture until the alcohol content therein is reduced to a point between 1/20 and 1/40 of the chemical equivalent amount of monocarboxylic acid present, and immediately thereafter feeding into the reaction mass while heating, equi-molecular proportions of alcohol and acid.

2. Process of claim 1 in which the acid is acetic acid and the alcohol is a butyl alcohol.

3. The process of producing esters from a butyl alcohol and acetic acid which comprises heating to about 100° C. a reaction mixture having proportionately the following composition:

| | Gallons |
|---|---|
| Acetic acid (100%) | 750 |
| N-butyl alcohol | 150 |
| Sulfuric acid (93%) | 30 |
| Water | 450 | continuing the said heating until the alcohol approaches depletion and the acetic acid in the distillate increases until the chemical equivalent ratio between the acid and the alcohol is between 20 and 40 equivalents of acid to each equivalent of alcohol, and immediately thereafter adding to the reaction mixture alcohol and acid at a rate substantially equal to that of distillation.

4. Process of claim 1 in which the catalyst is sulphuric acid.

5. Process of producing esters of butyl alcohol and acetic acid which comprises heating to about 100° C. a reaction mixture having proportionately about 5 volumes of acetic acid to 1 volume of butyl alcohol together with sulphuric acid and water, heating the mixture until the alcohol content has been reduced to a point such that the acid is present between 20 and 40 equivalents for each chemical equivalent of alcohol present, and maintaining this ratio by continually distilling and continually adding to the reaction mixture more alcohol and acid at a rate substantially equal to that of distillation, cooling the distilled vapors, allowing the distillation products to separate into two layers, removing the liquid of the layer rich in butyl acetate, recovering organic compounds from the water layer and returning them to the reaction mixture.

6. The process of producing esters from the lower monocarboxylic fatty acids and an alcohol having from 3 to 5 carbon atoms which comprises the improvement of maintaining a reaction mixture of acetic acid and alcohol in the ratio of 20 to 40 equivalents of acid to each chemical equivalent of alcohol in the presence of a catalyst and water, distilling the mixture, and feeding to the reaction mixture acid and alcohol in substantially the same proportions as they are removed by distillation.

THOMAS J. McKEON.